United States Patent [19]

Gupta et al.

[11] Patent Number: 5,441,109
[45] Date of Patent: Aug. 15, 1995

[54] ENZYME BREAKERS FOR BREAKING FRACTURING FLUIDS AND METHODS OF MAKING AND USE THEREOF

[75] Inventors: D. V. Satyanarayana Gupta, The Woodlands; Bethicia B. Prasek, Houston; Richard D. Horn, Spring, all of Tex.

[73] Assignee: The Western Company of North America, Houston, Tex.

[21] Appl. No.: 229,870

[22] Filed: Apr. 19, 1994

[51] Int. Cl.$^6$ .................................... E21B 43/26
[52] U.S. Cl. ...................... 166/300; 166/308; 507/201; 507/211; 507/921; 507/922
[58] Field of Search .............. 166/300, 308; 252/8.551; 507/201, 211, 921, 922

[56] References Cited

U.S. PATENT DOCUMENTS

| | | | |
|---|---|---|---|
| 4,502,967 | 3/1985 | Conway | 166/308 X |
| 4,506,734 | 3/1985 | Nolte | 166/308 |
| 5,067,566 | 11/1991 | Dawson | 166/308 |
| 5,164,099 | 11/1992 | Gupta et al. | 166/300 X |
| 5,201,370 | 4/1993 | Tjon-Joe-Pin | 166/300 |
| 5,224,544 | 7/1993 | Tjon-Joe-Pin et al. | 166/295 |
| 5,226,479 | 7/1993 | Gupta et al. | 166/300 |
| 5,247,995 | 9/1993 | Tjon-Joe-Pin et al. | 166/312 |

FOREIGN PATENT DOCUMENTS

WO91/18521  12/1991  WIPO.
WO91/18974  12/1991  WIPO.

*Primary Examiner*—George A. Suchfield
*Attorney, Agent, or Firm*—Peter A. Bielinski

[57] ABSTRACT

The present invention is directed to new enzyme breakers for breaking fracturing fluids or blocking gels, wherein the enzyme breakers only have activity above a selected temperature, i.e., no activity below the selected temperature or only active in a narrow temperature range. The present invention is preferably specifically directed to hemicellulase enzyme breakers only having activity above 100° F., 150° F., 200° F., or 250° F. and the method of making and use thereof.

7 Claims, No Drawings

ENZYME BREAKERS FOR BREAKING FRACTURING FLUIDS AND METHODS OF MAKING AND USE THEREOF

TECHNICAL FIELD OF THE INVENTION

The invention relates to methods for treating subterranean formations. Specifically, the invention is directed to compositions used to fracture subterranean formations and methods of use thereof. Further, the invention is directed to methods of fracturing subterranean formations utilizing fracturing compositions which include enzyme breakers. The invention also relates to the production of enzyme breakers only having a selected activity above a particular temperature.

BACKGROUND OF THE INVENTION

It is a common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and imposing sufficient pressure on the fracture fluid to cause formation breakdown with the attendant production of one or more fractures. The fracture or fractures may be horizontal or vertical, with the later usually predominating, and with the tendency toward vertical fracture orientation increasing with the depth of the formation being fractured. Usually a gel, an emulsion or a foam, having a proppant, such as sand or other particulate materials suspended therein, is introduced into the fracture. The proppant is deposited in the fracture and functions to hold the fracture open after the pressure is released and fracturing fluid is withdrawn back into the well. The fracturing fluid has a sufficiently high viscosity to penetrate into the formation to realize fracturing and to retain the proppant in suspension or at least to reduce the tendency of the proppant of settling out of the fracturing fluid. Generally, a gelation agent and/or an emulsifier is used to gel or emulsify the fracturing fluid to provide the high viscosity needed to realize the maximum benefits from the fracturing process.

After the high viscosity fracturing fluid has been pumped into the formation and the fracturing of the formation has been completed, it is, of course, desirable to remove the fluid from the formation to allow hydrocarbon production through the new fractures. Generally, the removal of the highly viscous fracturing fluid is realized by "breaking" the gel or emulsion or, in other words, by converting the fracturing fluid into a low viscosity fluid. Breaking a gelled emulsified fracturing fluid has commonly been obtained by adding "breaker", that is, a viscosity-reducing agent, to the subterranean formation at the desired time. This technique, however, can be unreliable, sometimes resulting in incomplete breaking of the fluid and/or premature breaking of the fluid before the process is complete. Premature breaking can decrease the number of fractures obtained and thus, the amount of hydrocarbon recovery. Further, it is known in the art that most fracturing fluids will break if given enough time and sufficient temperature and pressure. It is, of course, most desirable to return the well back to hydrocarbon production as quickly as possible.

There have been several proposed methods for the breaking of fracturing fluids which are aimed at eliminating the above problems. For example, U.S. Pat. No. 5,164,099 discusses several of the proposed methods, the description of which is hereby incorporated by reference. U.S. Pat. No. 5,164,099 discloses inter alia, see claim 1, a method for breaking an aqueous fracturing fluid comprised of introducing an encapsulated percarbonate, perchlorate, or persulfate breaker into a subterranean formation being treated with the fracturing fluid, said encapsulated breaker comprised of a polyamide membrane enclosing the breaker, said membrane permeable to a fluid in the subterranean formation such that the breaker diffuses through the membrane to break the fracturing fluid with said membranes staying intact throughout the method for breaking the fracturing fluid.

The above-identified methods of breaking fracturing fluids use various chemical agents such as oxidants, i.e., perchlorates, percarbonates and persulfates. Oxidants not only degrade the polymers of interest but also oxidize tubulars, equipment, etc. that they come into contact with, including the formation itself. In addition, oxidants also interact with resin coated proppants and, at higher temperatures, they interact with gel stabilizers used to stabilize the fracturing fluids which tend to be antioxidants. Also, the use of oxidants as breakers is disadvantageous from the point of view that the oxidants are not selective in degrading a particular polymer. In addition, chemical breakers are consumed stoichiometrically resulting in inconsistent gel breaking and some residual viscosity which causes formation damage.

The use of an enzyme to break fracturing fluids would eliminate some of the problems relating to the use of oxidants. For example, enzyme breakers are very selective in degrading the specific polymers. The enzymes do not effect the tubulars, equipment, etc. that they come in contact with and/or damage the formation itself. The enzymes also do not interact with the resin coated proppants commonly used in fracturing systems. Enzymes react catalytically such that one molecule of enzyme may hydrolyze up to one hundred thousand (100,000) polymer chain bonds resulting in a cleaner more consistent break and very low residual viscosity. Consequently, formation damage is greatly decreased. Also, unlike oxidants, enzymes do not interact with gel stabilizers used to stabilize the fracturing fluids.

Heretofore known enzyme breakers were of limited use because of their known activity range and sensitivity to metal ions. For example, according to the *Kirk-Othmer Encyclopedia of Chemical Technology* it is "well known that the folded structure by which catalytic activity [of enzymes] is achieved is destroyed >50°–70° C. (122° F.–158° F.)." Also, U.S. Pat. No. 5,201,370 discloses an enzyme breaker for galactomannan-based fracturing fluids wherein the enzyme breaker is effective to degrade the polymer gel at temperatures between 50° F. and 180° F. (See column 3, lines 55–58 and column 5, lines 42–44) More recently, a hemicellulase enzyme was disclosed in WO 91/18974, which is hereby incorporated herein by reference, having a range of activity from 0° C. (32° F.) to 90° C. (194° F.). Thus, heretofore known enzymes have had activity ranges from 30° C. (86° F.) to 90° C. (194° F.), i.e., the enzymes were active across the entire range, or a major portion of it, and were not active at all over 90° C. Therefore, heretofore it was believed that enzyme breakers effective over 194° F. were not possible and, consequently, the use of enzyme breakers in many fracturing systems was limited or even impossible. Moreover, heretofore all known enzymes for use as breakers displayed activity across a wide temperature range including low temperatures, thus making their use of limited value.

Also, according to the *Kirk-Othmer Encyclopedia of Chemical Technology*, "many enzymes are sensitive to transition metal ions that act as inhibitors of enzyme activity." Typically, in fracturing systems, in addition to borates, transition metal chelates such as titanates or zirconates are used as crosslinking agents for guar, cellulose and their derivatives. Thus, heretofore it was also believed that some enzymes would lose activity in the presence of these crosslinkers.

Typically, as set forth above, all enzymes are active at low temperatures between 0° and 70° C. Heretofore, if such an enzyme was used in a fracturing treatment incorporating a polymer gel, the enzyme would very rapidly break the gel and lower the viscosity of the fluid as soon as it came into contact with the gel. The gel would then be ineffective at carrying proppant and the fracturing treatment would fail. An enzyme breaker was needed which is inactive at low temperatures but becomes active at the temperatures encountered in the formation. Such an enzyme breaker could allow the high viscosity gel to carry proppant into the formation where upon it is heated by the formation and begins to break the gel. After a sufficient time, the heated enzyme will effectively catalytically break the polymer gel resulting in low polymer residue in the formation and minimal formation damage.

Therefore, there exists a need for an enzyme breaker having only a limited temperature range activity and being active over temperatures of about 200° F. The invention of the present application provides an enzyme breaker, having the advantages over oxidant breakers, whose activity is effective only over certain specific temperatures selected for a particular application, including applications involving temperatures over 200° F. and is not sensitive to transition metal ions.

SUMMARY OF THE INVENTION

The invention relates to methods for fracturing subterranean formations. Specifically, the invention is directed to a method of fracturing subterranean formations utilizing a fracturing fluid and controllably breaking said fluid with an enzyme breaker or a combination of an enzyme breaker with an encapsulated breaker.

The present invention is also directed to a composition for fracturing subterranean formations which includes the utilization of an enzyme breaker.

The most preferred embodiment of the enzyme breaker of the present invention is comprised of hemicellulase. The hemicellulase enzyme of the present invention is active only above a selected temperature as provided by the method of the present invention.

Using the present invention, there is provided a method of fracturing a subterranean formation which surrounds a well bore comprising the steps of: (1) injecting a fracturing fluid under pressure into the well bore; (2) injecting an enzyme breaker having only an activity above a selected temperature; (3) maintaining the fluid in the well bore under sufficient pressure to fracture the formation; and (4) breaking the fluid with the breaker.

Using the method of the present invention there is also provided a means of using an enzyme having only activity above selected temperatures, for example, 100° F., 150° F., 200° F., or 250° F.

Utilizing the method of the present invention there is also provided a system wherein a fracturing fluid is controllably broken at the desired time and temperature by an enzyme breaker while the filter cake lodged in the subterranean formation is reduced by an encapsulated breaker. In addition, by practicing the method of the present invention there is provided a system wherein a combination of enzymes having only specific selected activities over particular selected temperatures used alone or in combination with encapsulated breakers.

The present invention also provides a process for the manufacture and/or production of enzymes useful as breakers for fracturing fluids or blocking gels wherein the enzymes are heat treated or filtered to thus, create enzymes only having an activity over a selected temperature.

The present invention also provides a new enzyme breaker having drastic advantages over the previously heretofore known enzyme breakers. The enzyme breakers of the present invention have only an activity above a selected temperature, that is, using the method of the present invention one can produce an enzyme, for example, being only active above 100° F., 150° F., 200° F., or 250° F., etc. Therefore, as a result, an enzyme breaker produced in accordance with the method of the present invention can be made to be devoid of any activity below, for example, 100° F., 150° F., 200° F., or 250° F., respectively in relation to the above examples. In addition, the method of the present invention provides an enzyme breaker(s) having activity or in a given or selected temperature range. Thus, the present invention provides enzyme breakers having a selected specific activity heretofore unknown.

DETAILED DESCRIPTION

The method of the present invention is directed to the fracturing of subterranean formations with fluids which are known in the art. For example, the method of the present invention is directed to fracturing subterranean formations using aqueous-based fracturing fluids containing polymers such as guar, hydroxyalkylguar, carboxyalkylhydroxyguar, carboxyalkylhydroxyalkylguar, cellulose, hydroxyalkylcellulose, carboxyalkylhydroxyalkylcellulose, xanthum and the like. The present invention directed to fracturing fluids which are crosslinked. For example, fracturing fluids which are crosslinked by crosslinkers like borate, titanate, or zirconate. Specifically, the method of the present invention is directed to injecting a subterranean formation with a fracturing fluid as disclosed above, and breaking the fracturing fluid utilizing the enzyme breaker of the present invention. Also, the method of the present invention includes the breaking of "blocking gels" as described and claimed in U.S. Pat. No. 5,224,544 which is hereby incorporated by reference herein. The description, however, will be in terms of the preferred embodiment, i.e., the breaking of fracturing fluids.

Generally, the enzyme breaker of the present invention can be added to any fracturing fluid generally known in the art. In the practice of the present invention, the enzyme breaker can be injected with the fracturing fluid. Further, the enzyme breaker of the present invention can be added to a carrier fluid and then injected into the subterranean formation subsequent to, simultaneously with, or prior to the injection of the fracturing fluid. Enzyme breakers are often added with the fracturing fluid. The various fluids used to fracture formations and/or compositions are well known in the art and essentially contain a carrier fluid, using usually an aqueous liquid, and a viscosifing polymer. Fracturing fluids usually also contain one or more of the following: surfactants, salts, antifoaming agents and polymer thickeners.

After experimentation it was discovered that a typical enzyme which is active over a broad temperature range has components which may be active only in narrow temperature ranges and that such a component can be obtained and separated which has activity in a desired narrow range. For example, it was discovered that a hemicellulase has only 20% of its activity when held at 93° C. It was also discovered that when this component was isolated it had essentially no activity below 93° C. In this case, an enzyme component was obtained which must be heated to 93° C. to function.

The enzyme breakers of the present invention exhibit activity only above a selected temperature. In preferred embodiments, the enzyme breakers of the present invention only exhibit activity above 100° F., 150° F., 200° F., or 250° F.

The enzyme breakers of the present invention include enzymes having an activity above a selected temperature which are capable of breaking a particular fracturing fluid at the appropriate temperature for a given application or subterranean environment.

In a most preferred embodiment, the present invention relates to a heretofore unknown hemicellulase enzyme breaker only having an activity above a selected temperature wherein the selected temperature is 100° F., 150° F., 200° F., or 250° F. Consequently, the most preferred method of the present invention relates to fracturing fluids which are capable of being broken by hemicellulase, for example, cellulose and derivatives thereof and guar and derivatives thereof.

The method of the present invention includes the use of the novel enzyme breakers as disclosed herein in combination with other breakers, including other novel enzyme breakers of the present invention, and other known breakers including encapsulated breakers. The use of such combinations of breakers is dependant upon the specific application, the fracturing fluids, the desired break times and the given subterranean environment, etc.

The present invention also relates to the production of enzyme breakers heretofore unknown having only an activity above a selected temperature. The starting material for producing the enzyme breakers of the present invention are produced using known fermentation techniques. For example, the preferred embodiment, that is, using a hemicellulase enzyme starting material, can be made utilizing methods disclosed in WO 91/18974.

The procedure for preparing the enzyme breakers of the present invention using, for illustration purposes, the preferred embodiment, is as follows: obtaining a sample of hemicellulase enzyme produced in accordance with the methods disclosed in WO 91/18974; heat treating the sample of hemicellulase for a time sufficient at a selected temperature to denature or deactivate the low temperature component(s) of the hemicellulase enzyme or removing the enzyme component(s) with low temperature activity. Subsequently, recovering the enzyme component having only an activity above the selected temperature repeating the above steps until a sufficient amount of high temperature active enzyme is recovered.

Other means known in the art, such as ultrafiltration, may be used to separate the high temperature component, that is, the component having activity above the selected temperature, from the low temperature component.

The heat treatment temperature can be selected as desired for a particular application and/or specific type of formation. The amount of time needed for heat treatment will necessarily depend on the weight of the sample of enzyme and the type of enzyme being treated.

EXAMPLES

The following test results illustrate the high temperature activity of the preferred embodiment of the present invention. The viscosity of the fluids was measured using a "FANN 50 C" viscometer. The amount of enzyme breaker added is indicated in parenthesis.

In each of the following examples the tradenames used are defined as follows: "BUFFER 7L TM" buffer: is a low pH buffer (approx. 5.8) available from The Western Company of North America; "BUFFER 6L TM" buffer: is a high pH buffer (approx. 12.0) available from The Western Company of North America; "CL-30": is a borate crosslinker slurried in diesel oil available from The Western Company of North America; "J-22L TM" gel: is a sodium carboxymethlyhydroxypropylguar gelling agent slurried in diesel oil available from The Western Company of North America; "J-4L TM" slurried polymer concentrate is a concentrated liquid guar based polymer gelling agent available from The Western Company of North America; "CLAY/TREAT 2C TM" clay stabilizer: is a KCl substitute available from The Western Company of North America; "GELMASTER TM" gel stabilizer: is a gel stabilizer available from The Western Company of North America; "CL-14 TM and CL-22C TM" crosslinkers: are zirconium chelate crosslinking agents available from The Western Company of North America.

The symbol "#" means that the substance is present in the fluid in the ratio of the designated number of pounds per thousand gallons of fluid. The designation "gpt" denotes that the substance is present in the fluid in a ratio of the stated number of gallons per thousand gallons of fluid.

Example 1

The fluid used in the following test was comprised of 40 # "J-22L TM", gellant tap water, 1 gpt "ClAY TREAT 2C TM" clay stabilizer and 10 # "GELMASTER TM" gel stabilizer. The pH of the fluid was raised to pH 10.7 with sodium hydroxide and crosslinked with 1 gpt "CL-14 TM" crosslinker. The breaker, when used, was added at room temperature.

| Time (min.) | Temp. (°F.) | Viscosity (cP) at 100 sec$^{-1}$ |
|---|---|---|
| A (No breaker) | | |
| 2 | 284 | 996 |
| 32 | 298 | 546 |
| 62 | 299 | 350 |
| 92 | 299 | 239 |
| 122 | 299 | 155 |
| 152 | 299 | 97 |
| 182 | 298 | 52 |
| 212 | 299 | 35 |
| 242 | 299 | 26 |
| B (1 # breaker) | | |
| 2 | 284 | 896 |
| 32 | 299 | 462 |
| 62 | 299 | 293 |
| 92 | 299 | 210 |
| 122 | 299 | 127 |
| 152 | 299 | 88 |
| 182 | 299 | 61 |
| 212 | 299 | 47 |
| 242 | 299 | 33 |
| C (5 # breaker) | | |
| 2.3 | 283 | 509 |
| 32.2 | 298 | 129 |
| 62.3 | 299 | 71 |

Example 2

The fluid used below was comprised of 40 # "J-22L TM" gellant, tap water, 2% potassium chloride, 10 # "GELMASTER TM" gell stabilizer. The pH of the fluid was raised to pH 9.3 with sodium hydroxide and crosslinked with 0.75 gpt "CL-14 TM" crosslinker. The breaker, when used, was added at room temperature.

| Time (min.) | Temp. (°F.) | Viscosity (cP) at 100 sec$^{-1}$ |
|---|---|---|
| A (No breaker) | | |
| 2 | 248 | 522 |
| 32 | 250 | 524 |
| 62 | 250 | 519 |
| 92 | 250 | 489 |
| 122 | 250 | 459 |
| 152 | 250 | 438 |
| 182 | 250 | 412 |
| 212 | 250 | 389 |
| 242 | 250 | 367 |
| B (2 # breaker) | | |
| 2 | 247 | 481 |
| 32 | 250 | 398 |
| 62 | 250 | 340 |
| 92 | 250 | 297 |
| 122 | 250 | 267 |
| 152 | 250 | 262 |
| 182 | 250 | 229 |
| 212 | 250 | 195 |
| 242 | 250 | 176 |
| C (3.5 # breaker) | | |
| 2 | 247 | 367 |
| 32 | 250 | 297 |
| 62 | 250 | 223 |
| 92 | 250 | 173 |
| 122 | 250 | 132 |
| 152 | 250 | 99 |
| 182 | 250 | 75 |
| 212 | 250 | 59 |
| 242 | 250 | 48 |
| D (5 # breaker) | | |
| 2 | 247 | 341 |
| 32 | 250 | 275 |
| 62 | 250 | 177 |
| 92 | 250 | 79 |
| 122 | 250 | 44 |
| 152 | 250 | 26 |

Example 3

The fluid used below was comprised of 40 # "J-22L TM" gellant, tap water and 2% potassium chloride. The pH of the fluid was raised to 9.3 with sodium hydroxide and crosslinked with 0.75 gpt "CL-14 TM" crosslinker. The breaker, when used, was added at room temperature.

| Time (min.) | Temp. (°F.) | Viscosity (cP) at 100 sec$^{-1}$ |
|---|---|---|
| A (No breaker) | | |
| 2 | 195 | 363 |
| 32 | 200 | 363 |
| 62 | 200 | 346 |
| 92 | 200 | 329 |
| 122 | 200 | 311 |
| 152 | 200 | 292 |
| 182 | 200 | 280 |
| 212 | 200 | 271 |
| 242 | 200 | 256 |
| B (2 # breaker) | | |
| 2 | 194 | 407 |
| 32 | 200 | 361 |
| 62 | 200 | 234 |
| 92 | 200 | 186 |
| 122 | 200 | 157 |
| 152 | 200 | 137 |
| 182 | 200 | 123 |
| 212 | 200 | 114 |
| 242 | 200 | 105 |
| C (3 # breaker) | | |
| 2 | 194 | 431 |
| 32 | 200 | 298 |
| 62 | 200 | 169 |
| 92 | 200 | 114 |
| 122 | 200 | 84 |
| 152 | 200 | 61 |
| 182 | 200 | 50 |
| 212 | 200 | 43 |
| 242 | 200 | 35 |
| D (4 # breaker) | | |
| 2 | 194 | 332 |
| 32 | 200 | 217 |
| 62 | 200 | 96 |
| 92 | 200 | 57 |
| 122 | 200 | 41 |
| 152 | 200 | 33 |
| 182 | 200 | 29 |

Example 4

The fluid used below was comprised of 40 # "J-4L TM" gellant, tap water, 2% potassium chloride, 10 # GELMASTER TM" gell stabilizer. The pH of the fluid was raised to pH 11.0 with "BUFFER 6L TM "buffer, and crosslinked with 1.25 gpt "CL-30 TM" crosslinker. The breaker, when used, was added at room temperature.

| Time (min.) | Temp. (°F.) | Viscosity (cP) at 100 sec$^{-1}$ |
|---|---|---|
| A (No breaker) | | |
| 2 | 244 | 639 |
| 31 | 250 | 590 |
| 61 | 250 | 488 |
| 91 | 250 | 494 |
| 121 | 250 | 450 |
| 151 | 250 | 442 |
| 181 | 250 | 451 |
| 211 | 250 | 422 |
| 241 | 250 | 435 |
| B (5 # breaker) | | |
| 2.3 | 245 | 692 |
| 31.3 | 250 | 619 |
| 61.3 | 250 | 474 |

-continued

| Time (min.) | Temp. (°F.) | Viscosity (cP) at 100 sec$^{-1}$ |
|---|---|---|
| 91.3 | 250 | 306 |
| 121.3 | 250 | 217 |
| 151.3 | 250 | 142 |
| 181.3 | 250 | 107 |
| 211.3 | 250 | 83 |
| 241.3 | 250 | 76 |
| C (7 # breaker) | | |
| 2.3 | 246 | 604 |
| 31.3 | 250 | 334 |
| 61.3 | 250 | 130 |
| 91.3 | 250 | 98 |
| 121.3 | 250 | 87 |
| 151.3 | 250 | 81 |
| 181.3 | 250 | 72 |
| 211.3 | 250 | 65 |
| 241.3 | 250 | 63 |

Example 5

The fluid used below was comprised of of 40 # "J-22L TM" gellant, tap water, 2% KCl, 10 # "GELMASTER TM" gell stabilizer. The fluid pH was adjusted to 5.8 with "BUFFER 7L TM" buffer and crosslinked with 0.85 gpt "CL-22C TM". The breaker where applicable was added at room temperature.

| Time (min.) | Temp. (°F.) | Viscosity (cP) at 100 sec$^{-1}$ |
|---|---|---|
| A (No breaker) | | |
| 2.3 | 239 | 685 |
| 32.3 | 239 | 672 |
| 62.3 | 249 | 630 |
| 92.3 | 250 | 575 |
| 122.3 | 250 | 520 |
| 152.3 | 250 | 464 |
| 182.3 | 250 | 417 |
| 212.3 | 250 | 370 |
| 242.3 | 250 | 331 |
| B (5 # breaker) | | |
| 2.3 | 238 | 465 |
| 32.3 | 249 | 440 |
| 62.3 | 250 | 385 |
| 92.3 | 250 | 320 |
| 122.3 | 250 | 260 |
| 152.3 | 250 | 219 |
| 182.3 | 250 | 184 |
| 212.3 | 250 | 158 |
| 242.3 | 250 | 136 |
| C (10 # breaker) | | |
| 2.3 | 236 | 333 |
| 32.3 | 250 | 304 |
| 62.3 | 250 | 235 |
| 92.3 | 250 | 165 |
| 122.3 | 250 | 120 |
| 152.3 | 250 | 86 |
| 182.3 | 250 | 62 |
| 212.3 | 250 | 46 |

-continued

| Time (min.) | Temp. (°F.) | Viscosity (cP) at 100 sec$^{-1}$ |
|---|---|---|
| 242.3 | 250 | 34 |

In all the above examples when the raw enzyme was used which was not heat-treated, the fluid viscosity at any breaker loading and any temperature (200°, 250° or 300° F.), was instantaneously less than 30 cP indicating premature fluid degradation.

The examples clearly showed that a component of the enzyme could be obtained which is not active below a desired temperature and retains catalytic activity at higher temperatures. The availability of such an enzyme component makes the use of enzymes possible in high temperature applications such as the fracturing procedures described above.

While the illustrative embodiments of the invention have been described with particularity, it will be understood that various other modifications will be apparent to and can be readily made by those skilled in the art without departing from the spirit and scope of the invention. Accordingly, it is not intended that the scope of claims appended hereto be limited to the examples and description set forth herein, but rather that the claims be construed as encompassing all the features of patentable novelty which reside in the present invention, including all features which would be treated as equivalents thereof by those skilled in the art to which the invention pertains.

What is claimed is:

1. A method of fracturing a subterranean formation which surrounds a well bore comprising the steps of:
   (a) injecting a fracturing fluid under pressure into the well bore;
   (b) injecting an enzyme breaker having activity only above a selected temperature, said selected temperature being at least equal to or greater than 100° F.;
   (c) maintaining the fluid in the well bore under sufficient pressure to fracture the formation; and
   (d) breaking the fluid with the breaker.

2. The method of claim 1 further comprising injecting an encapsulated breaker before, during or after the injection of that enzyme breaker.

3. The method of claim 1 further comprising injecting a second enzyme breaker having an activity over a different selected temperature than the first enzyme breaker before, during or after the injection of said enzyme breaker.

4. The method of claim 1 wherein the selected temperature is equal to or greater than 150° F.

5. The method of claim 1 wherein the selected temperature is equal to or greater than 200° F.

6. The method of claim 1 wherein the selected temperature is equal to or greater than 250° F.

7. The method of claim 1 wherein the enzyme breaker is comprised of hemicellulase.

* * * * *